US010436361B2

(12) United States Patent
Kawanishi

(10) Patent No.: US 10,436,361 B2
(45) Date of Patent: Oct. 8, 2019

(54) PIPE COUPLING DEVICE

(71) Applicant: SK-KAWANISHI CO., LTD., Kagawa (JP)

(72) Inventor: Hidehito Kawanishi, Kagawa (JP)

(73) Assignee: SK-KAWANISHI CO., LTD., Kagawa (JP)

(*) Notice: Subject to any disclaimer, the term of this patent is extended or adjusted under 35 U.S.C. 154(b) by 291 days.

(21) Appl. No.: 15/382,016

(22) Filed: Dec. 16, 2016

(65) Prior Publication Data
US 2017/0211734 A1 Jul. 27, 2017

(30) Foreign Application Priority Data

Dec. 17, 2015 (JP) ................. 2015-246732

(51) Int. Cl.
F16L 23/036 (2006.01)
F16L 23/024 (2006.01)
F16L 21/04 (2006.01)
F16L 21/08 (2006.01)

(52) U.S. Cl.
CPC .......... F16L 23/036 (2013.01); F16L 21/04 (2013.01); F16L 21/08 (2013.01); F16L 23/024 (2013.01)

(58) Field of Classification Search
CPC ........ F16L 23/036; F16L 21/04; F16L 23/024
USPC ............... 285/337, 339, 348, 420, 341–343, 285/414–415
See application file for complete search history.

(56) References Cited

U.S. PATENT DOCUMENTS 4,119,335 A * 10/1978 Rieffle ................. F16L 21/022
285/249
4,127,290 A * 11/1978 Mutschlechner ....... F16L 21/06
285/343
4,429,903 A * 2/1984 Baker .................... F16K 27/00
285/24
4,610,471 A * 9/1986 Halen .................... F16L 47/14
285/148.13

(Continued)

FOREIGN PATENT DOCUMENTS

JP S63-160489 U 10/1988
JP H09-014545 A 1/1997
(Continued)

Primary Examiner — Anna M Momper
Assistant Examiner — Fannie C Kee
(74) Attorney, Agent, or Firm — Michael Best & Friedrich LLP

(57) ABSTRACT

A pipe coupling device includes: a joint body into which a joining pipe is inserted; a C-ring-shaped retaining ring that includes a flange part protruding from an outer peripheral surface thereof fixed onto an outer peripheral surface of the joining pipe; and a pressing plate having a recessed part for housing the flange part. The retaining ring further includes a second flange part protruding from the outer peripheral surface thereof. The pressing plate further includes a pair of through-holes through which the coupling members penetrate, and a second recessed part for housing the second flange part. The second flange parts are provided with a circumferential center portion of the ring body between them, and the pressing plates are provided with the circumferential center portion between them. The recessed part is located between the through-holes, and the second recessed part is located outward of the through-holes in the circumferential direction.

5 Claims, 13 Drawing Sheets

(56) References Cited

U.S. PATENT DOCUMENTS

| | | | |
|---|---|---|---|
| 4,711,426 A * | 12/1987 | Bodnar | F16L 21/08 251/151 |
| 5,803,513 A * | 9/1998 | Richardson | F16L 21/08 285/337 |
| 6,019,396 A * | 2/2000 | Saito | F16L 21/08 285/3 |
| 2016/0290538 A1 | 10/2016 | Kawanishi | |

FOREIGN PATENT DOCUMENTS

| | | |
|---|---|---|
| JP | H10-082508 A | 3/1998 |
| WO | WO-2015/087802 A1 | 6/2015 |

\* cited by examiner

PIPE COUPLING DEVICE

TECHNICAL FIELD

The present invention relates to a pipe coupling device. More specifically, the present invention relates to a pipe coupling device which couples, by use of a coupling member, a joint body into which a joining pipe is inserted, a C-ring-shaped retaining ring which includes a flange part protruding from the outer peripheral surface thereof and which is fastened and fixed by use of a fixing member onto the outer peripheral surface of the joining pipe, and a pressing plate including a recessed part for housing the flange part.

BACKGROUND ART

To date, as an example of the pipe coupling device described above, a pipe coupling device disclosed in International Publication WO2015/087802 (FIG. 10C) has been known, for example. In this pipe coupling device 1', as shown in FIGS. 12 and 13, for example, a ring-shaped retaining ring 4' is provided with flange parts 41' protruding from the outer peripheral surface thereof, and the flange parts 41' are housed in a recessed part 51' formed in a pressing plate 5'. Further, coupling members 52', each having a through-hole 53' through which a bolt 6' is inserted, are provided at opposed ends of the recessed part 51'.

SUMMARY OF THE INVENTION

A pipe coupling device according to the present invention includes: a joint body into which a joining pipe is inserted; a C-ring-shaped retaining ring which includes a flange part protruding from an outer peripheral surface thereof and which is fastened and fixed by a fixing member onto an outer peripheral surface of the joining pipe; and a pressing plate having a recessed part for housing the flange part. The joint body, the C-ring-shaped retaining ring, and the pressing plate are coupled together by use of coupling members. The retaining ring further includes a second flange part protruding from the outer peripheral surface thereof. The pressing plate further includes a pair of through-holes through which the coupling members penetrate, and a second recessed part for housing the second flange part. A pair of the second flange parts are provided with a circumferential center portion of the ring body between them, and a pair of the pressing plates are provided with the circumferential center portion between them. The recessed part is located between the pair of the through-holes, and the second recessed part is located outward of at least one of the pair of the through-holes in the circumferential direction.

According to the above configuration, the retaining ring further includes the second flange part protruding from the outer peripheral surface thereof, the pressing plate further includes the second recessed part for housing the second flange part, and the second recessed part is located outward of at least one of the pair of the through-holes of the pressing plate, in the circumferential direction. With this arrangement, as shown in FIG. 9, the recessed part 51 and the flange parts 41 housed in the recessed part 51 are located outward (on a side away from the center O of the joining pipe) with respect to a straight line L connecting center axes A of the coupling members 6 penetrating the pair of the through-holes. Therefore, when a large detachment force is applied, the flange parts 41 press the recessed part 51 and thereby the pressing plate 5 attempts to incline toward the joining pipe 2 side. Meanwhile, the second recessed part 55 and the second flange part 42 housed in the second recessed part 55 are located inward (on a side where the center O of the joining pipe is present) with respect to the straight line L. Therefore, even when the pressing plate 5 attempts to incline when being pressed by the flange parts 41, the pressing plate 5 cannot incline because the second flange part 42 is in contact with the second recessed part 55.

Preferably, the second flange part is located on the circumferential center portion side with respect to the flange part, and the second recessed part is located outward, in the circumferential direction, of the through-hole close to the circumferential center portion. Since variation (deformation) due to reduction in the diameter of the retaining ring is small at the circumferential center portion, influence of the reduction in the diameter on the second flange part can be suppressed, and the second flange part is prevented from being detached from the second recessed part at the time of fastening.

Preferably, at least two pairs of the flange parts are provided with the circumferential center portion between the two pairs, and the flange parts, the second flange parts, and the pressing plates are arranged linearly symmetrically with respect to the circumferential center portion. Thus, balance of the reduction in the diameter of the retaining ring with respect to the joining pipe can be secured, and the pipe coupling device can be constituted by less number of parts, resulting in good workability.

Preferably, each of the flange part and the second flange part has a substantially rectangular parallelepiped shape extending along an axial direction of the joining pipe. In this case, since a portion, of the retaining ring, corresponding to the flange part in the circumferential direction is reduced, influence of the flange part on the reduction in the diameter can be suppressed, whereby the diameter of the retaining ring can be uniformly reduced with a low fastening force, resulting in improved workability. In the above configuration, as the joining pipe, a plastic pipe is adopted, for example.

DESCRIPTION OF EMBODIMENTS

Hereinafter, the present invention will be described in more detail with reference to the drawings as necessary.

Figure 1:
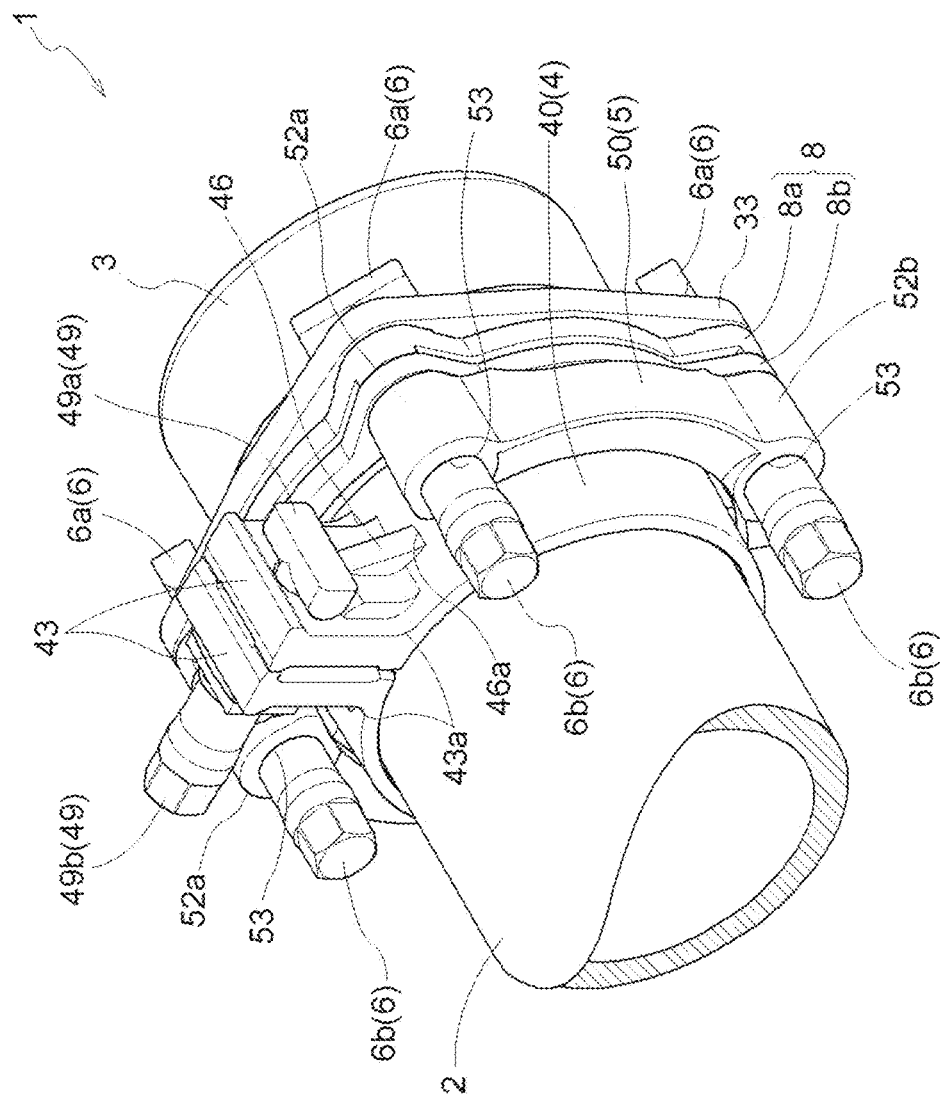
FIG. 1 is a perspective view of a pipe coupling device according to the present invention.
Figure 2:
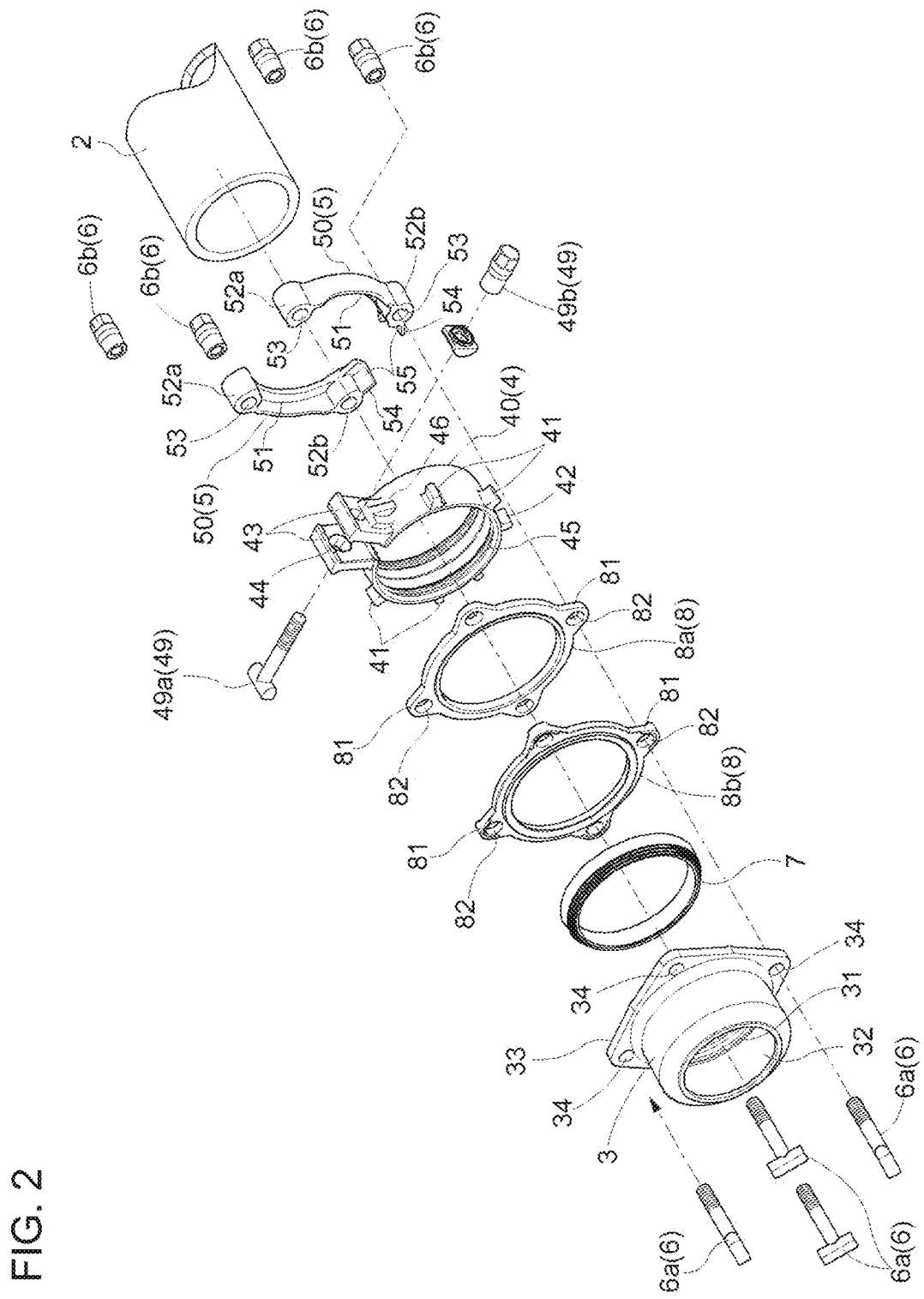
FIG. 2 is an exploded perspective view of the pipe coupling device according to the present invention.
Figure 3:
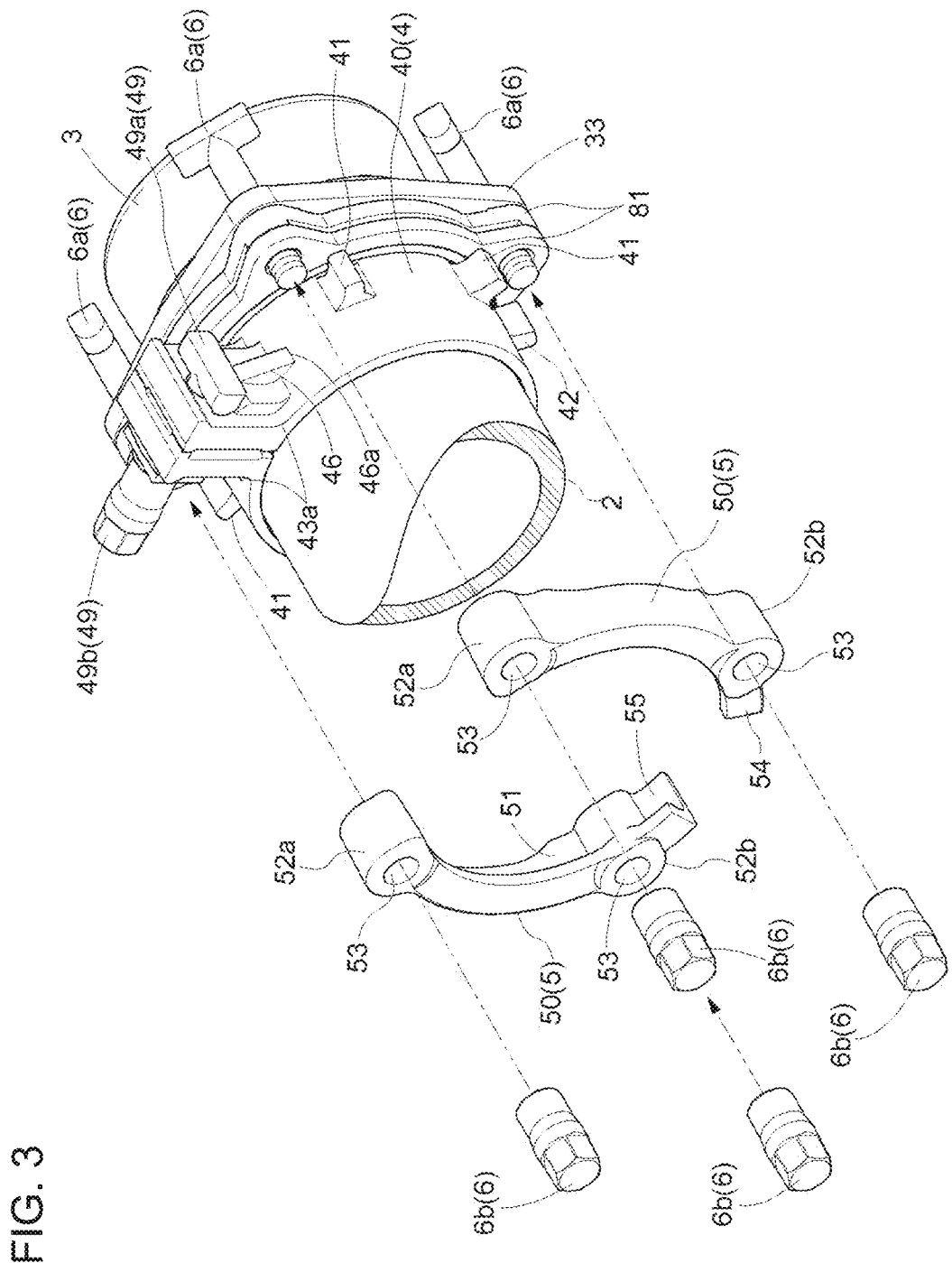
FIG. 3 is a view corresponding to FIG. 1 in a state where pressing plates are disconnected.
Figure 4:
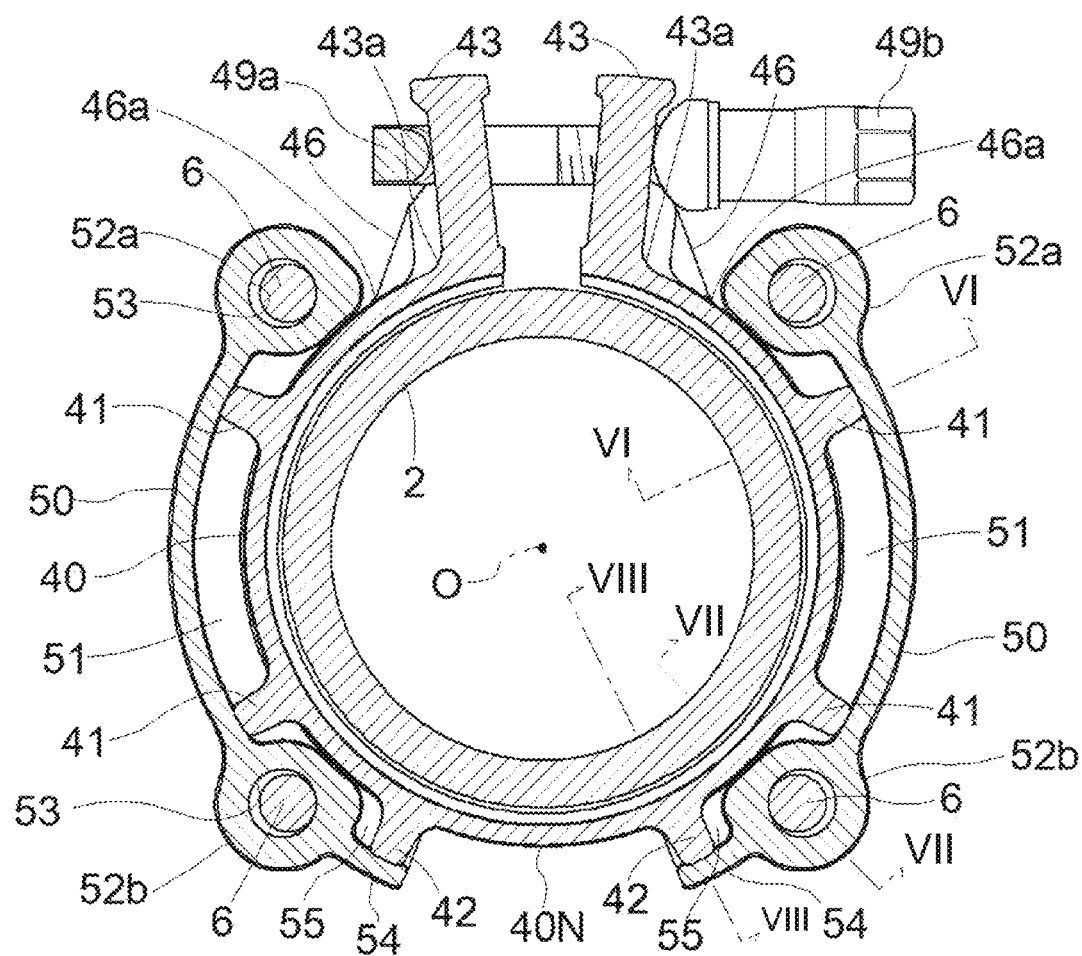
FIG. 4 is a longitudinal cross-sectional view before a retaining ring is fastened.

As shown in FIGS. 1 to 3, in general, a pipe coupling device 1 according to the present invention includes: a joint body 3 into which a joining pipe 2 is inserted; a C-ring-shaped retaining ring 4 which includes flange parts 41 each protruding from the outer peripheral surface thereof and which is fastened and fixed by fixing members 49 onto the outer peripheral surface of the joining pipe 2; and pressing plates 5 which include recessed parts 51 for housing the flange parts 41. The joint body 3, the C-ring-shaped retaining ring 4, and the pressing plates 5 are coupled and fixed together by coupling members 6. In addition, a packing 7 is mounted to a socket part 31 of the joint body 3, and a press ring 8 presses the packing 7 through the pressing plates 5 by being secured by the coupling members 6. It should be noted that, in the present embodiment, as the coupling members 6, four T-head bolts 6a, 6b (hereinafter simply referred to as "bolts") are used.

In the present embodiment, the joining pipe 2 is a polyethylene pipe for water distribution (made of PE100), for example. In the case of a polyethylene pipe, the pipe itself deforms (stretches and flexes), and therefore deforms along with deformation of the retaining ring 4 under a thrust caused by a tensile force toward the pipe axial direction, which occurs in the joining pipe 2. Even when such a flexible plastic pipe is used, the pipe coupling device 1 according to the present invention prevents deformation and/or breakage of the retaining ring 4, the pressing plates 5, and the like, improves the pipe holding force, and secures a tensile strength not less than the tensile yield strength (20 MPa) of the polyethylene pipe.

As shown in FIGS. 1 to 3, in general, the joint body 3 includes: the socket part 31 which has a taper shape and to which the packing 7 is mounted; and a cavity 32 in which an end portion of the joining pipe 2 is located. A substantially square flange 33 is provided so as to stand from the outer periphery of the joint body 3. The flange 33 has, at four corners thereof, through-holes 34 through which the T-head bolts 6 are inserted.

As shown in FIGS. 1 to 5, the retaining ring 4 includes: a ring body 40 having a C-ring shape; a plurality of flange parts 41 and a plurality of second flange parts 42 which protrude from the outer peripheral surface of ring body 40; and a pair of protruding pieces 43 which respectively protrude outward from opposed ends of the ring body 40. In each protruding piece 43, a through-hole 44 through which bolt 49a, 49b as the fixing member 49 is inserted is provided. In addition, an annular teeth part 45 for suppressing slipping of the joining pipe 2 is formed on the inner surface of the ring body 40. A reinforcement part 46 is formed in a taper shape between the ring body 40 and each protruding piece 43.

In a case where the reinforcement part 46 is not provided, when the pair of protruding pieces 43 are fastened by the fixing members 49, the fastening force is likely to concentrate on base end portions 43a of the protruding pieces 43, and local deformation (depression) occurs toward the joining pipe 2 side, which makes it difficult to uniformly reduce the diameter of the ring body 40. By providing the reinforcement part 46, the fastening force is dispersed to an end portion 46a of the reinforcement part 46, whereby local deformation (depression) at the base end portion 43a is suppressed, and the pipe holding force is increased.

As shown in FIGS. 4 to 8, a pair of flange parts 41 are provided at an appropriate interval on one side of the ring body 40 (between the protruding piece 43 and a center portion 40N of the ring body 40). The pair of flange parts 41 are housed in the recessed part 51 of the pressing plate 5 as described later. In addition, the second flange parts 42 are provided at positions closer to the center portion 40N of the ring body 40 than the flange parts 41. Each second flange part 42 is housed in a second recessed part 55 of the pressing plate 5 as described later.

Since the diameter of the ring body 40 is reduced when the pair of protruding pieces 43 are fastened by the fixing members 49, variation (deformation) due to the reduction in the diameter is smallest at the center portion 40N most distant from the pair of protruding pieces 43. Therefore, by providing the second flange parts 42 near the center portion 40N, influence by the reduction in the diameter can be suppressed, and the second flange parts 42 is prevented from being detached from the second recessed parts 55 of the pressing plates 5.

In the present embodiment, as shown in FIGS. 4 to 6 and 8, each of the flange parts 41 and the second flange parts 42 extends along the pipe axial direction so that the length thereof in the axial direction is greater than the thickness thereof in the circumferential direction. For example, it is sufficient that the length L in the axial direction is not less than 1.5 times the thickness T in the circumferential direction. If the length L is not less than 1.5 times the thickness T, deformation of the flange parts 41, 42 toward the front side and the pipe axis side can be suppressed against the thrust of the pipe. The thickness T is about the thickness of the ring body 40. Accordingly, even when the retaining ring 4 and the pressing plate 5 come into contact with each other under the thrust of the joining pipe 2, since each of the flange parts 41 and the second flange parts 42 is narrow in the circumferential direction and long in the axial direction, deformation of the flange parts 41 and the second flange parts 42 toward the joint body 3 side can be prevented, and thus the pipe holding force is improved.

When the diameter of the ring body 40 is reduced due to the fastening and fixing by the fixing members 49, the degree of the reduction in the diameter is small (the diameter is less likely to be reduced) at portions corresponding to the flange parts 41 and the second flange parts 42, and the degree of the reduction in the diameter is greater at the other portions than at the portions corresponding to the flange parts 41 and the second flange parts 42. Since each of the flange parts 41 and the second flange parts 42 extends along the pipe axial direction and is narrow in the circumferential direction, influence of the flange parts 41 and the second flange parts 42 on the reduction in the diameter of the ring body 40 can be reduced. Accordingly, fastening of the ring body 40 can be easily and uniformly performed with a low fastening force, and the pipe holding force is also improved. In addition, the pair of flange parts 41 and the pair of second flange parts 42 are each arranged linearly symmetrically with respect to the center portion 40N of the ring body 40. Accordingly, the diameter of the ring body 40 can be reduced more uniformly with respect to the center O of the joining pipe 2, which secures balance of the reduction in the diameter of the ring body 40.

As shown in FIGS. 1 to 5, in general, each pressing plate 5 includes: an arc-shaped body part 50 extending along the outer peripheral surface of the retaining ring 4; the recessed part 51 for housing the flange parts 41; and the second recessed part 55 for housing the second flange part 42. The recessed part 51 is formed between upper and lower coupling parts 52a and 52b each having a through-hole 53 through which a bolt 6 is inserted. The second recessed part 55 is formed at a protruding portion 54 that protrudes from the lower coupling part 52b toward the center portion 40N of the ring body 40 along the retaining ring 4.

Figure 9:
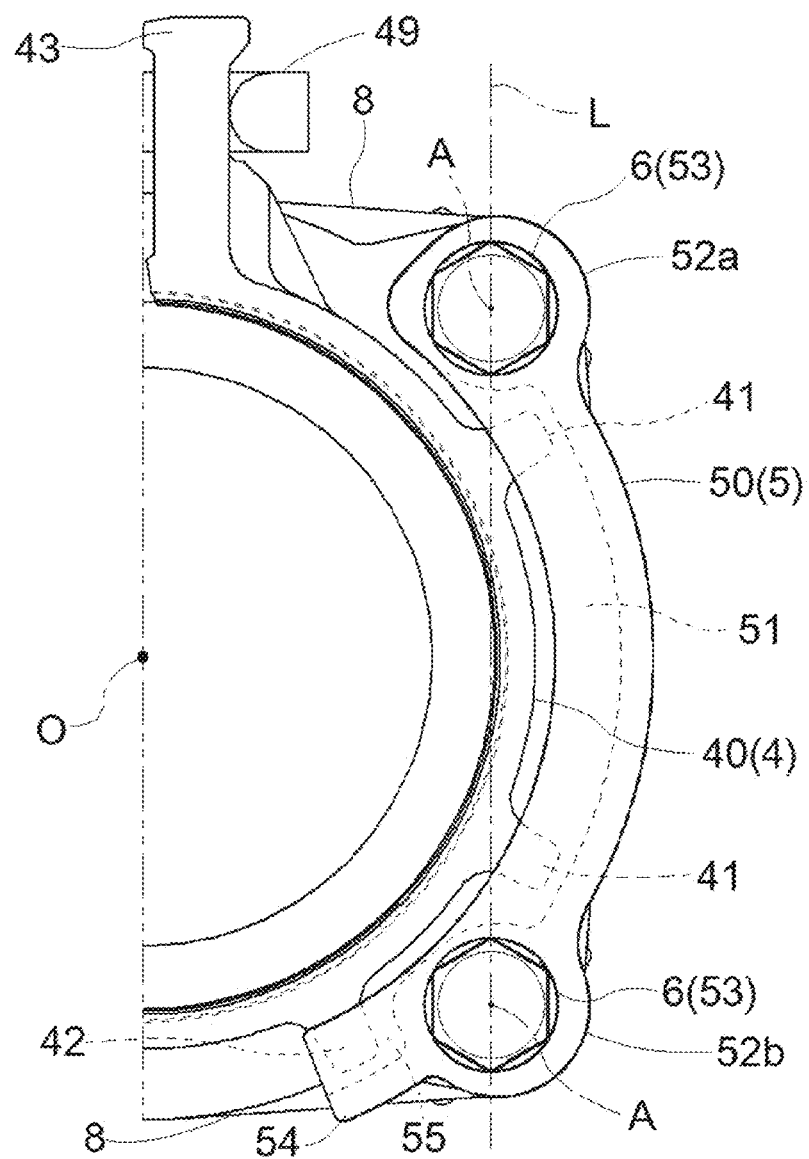
FIG. 9 is a front view (viewed in a pipe axial direction) of the pipe coupling device after fastening.

As shown in FIG. 9, the pair of flange parts 41 housed in the recessed part 51 are located outward of a straight line L connecting center axes A of the bolts 6 that penetrate through the through-holes 53. Therefore, although the flange parts 41 of the retaining ring 4 come into contact with the recessed part 51 when a detachment force is generated in the joining pipe 2, since the contact portions thereof are positioned outward of the straight line L connecting the center axes A of the bolts 6 that fix the pressing plate 5, a force that causes the pressing plate 5 to incline around the straight line L toward the joining pipe 2 side acts on the pressing plate 5.

Figure 5:
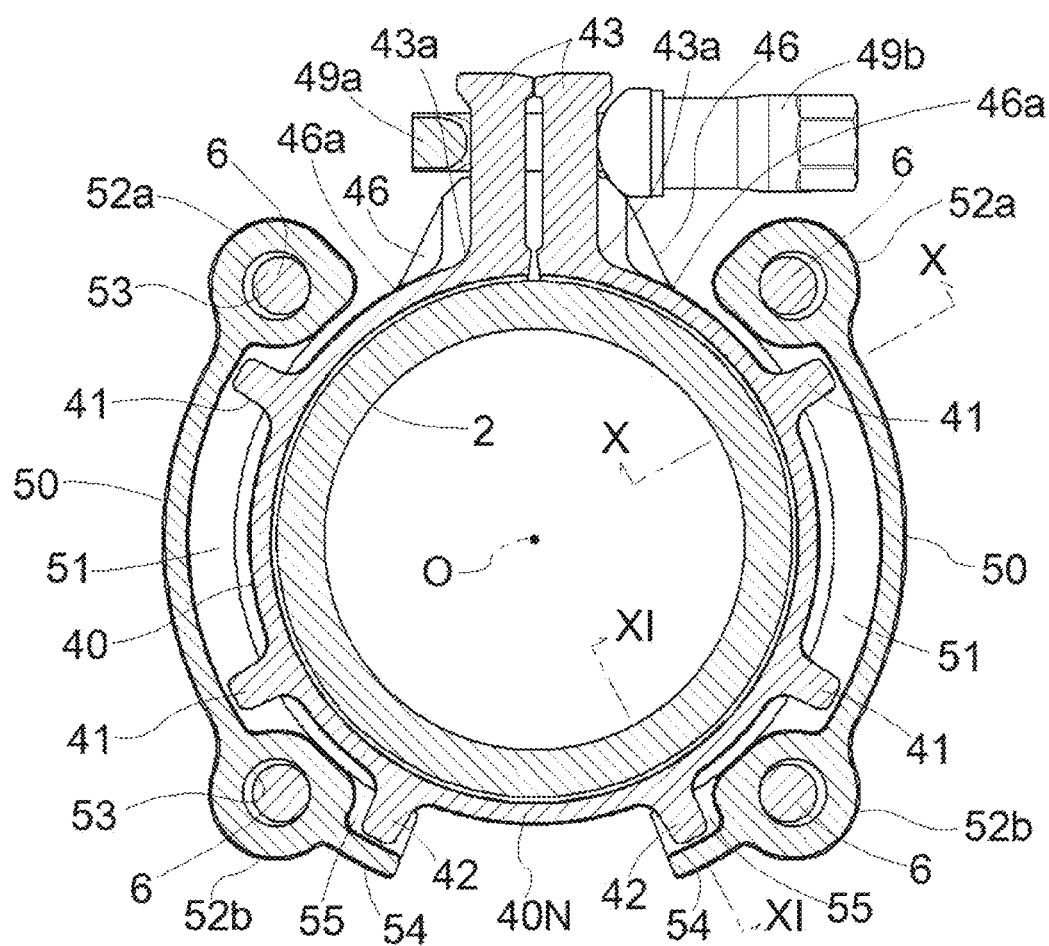
FIG. 5 is a longitudinal cross-sectional view after the retaining ring is fastened.
Figure 6:
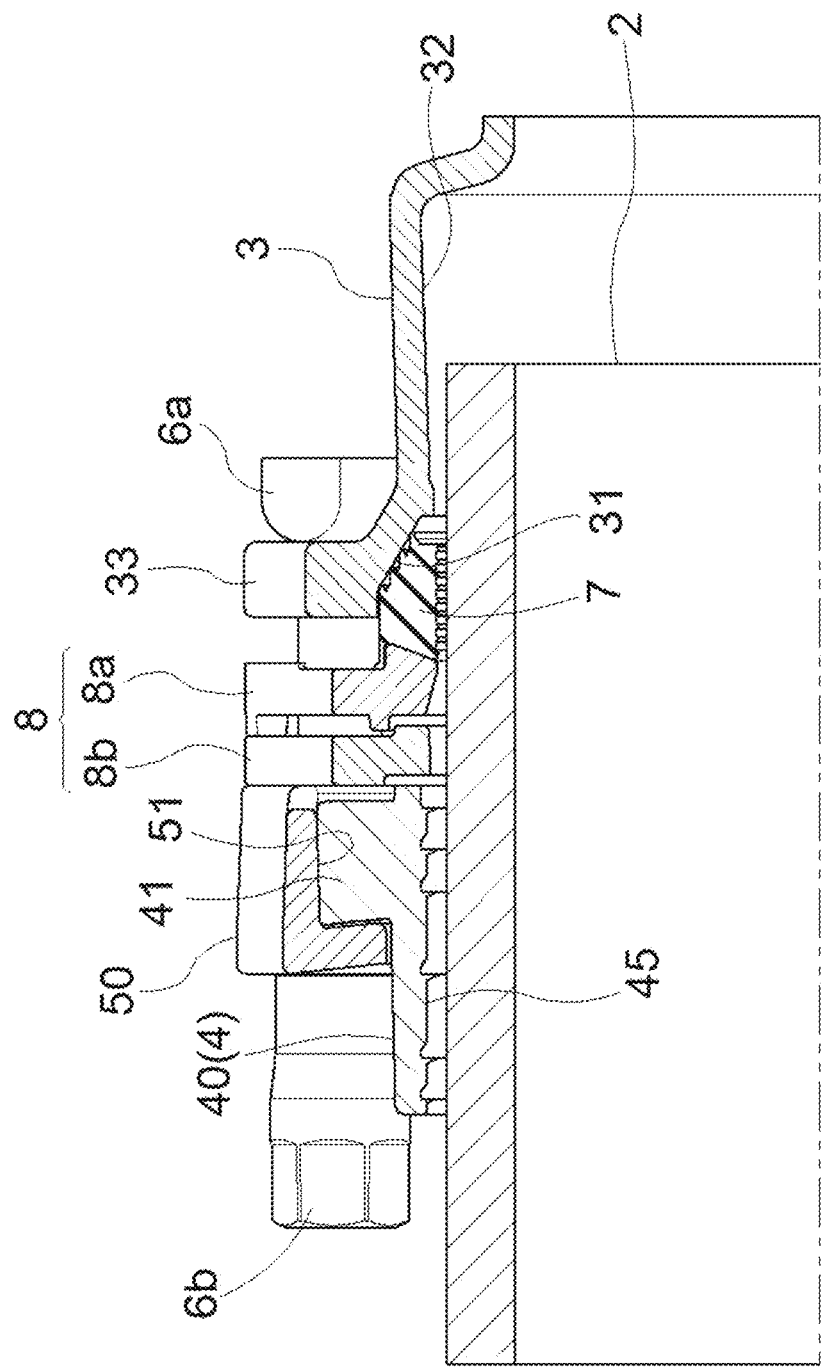
FIG. 6 is a cross-sectional view taken along a line VI-VI in FIG. 4.
Figure 7:
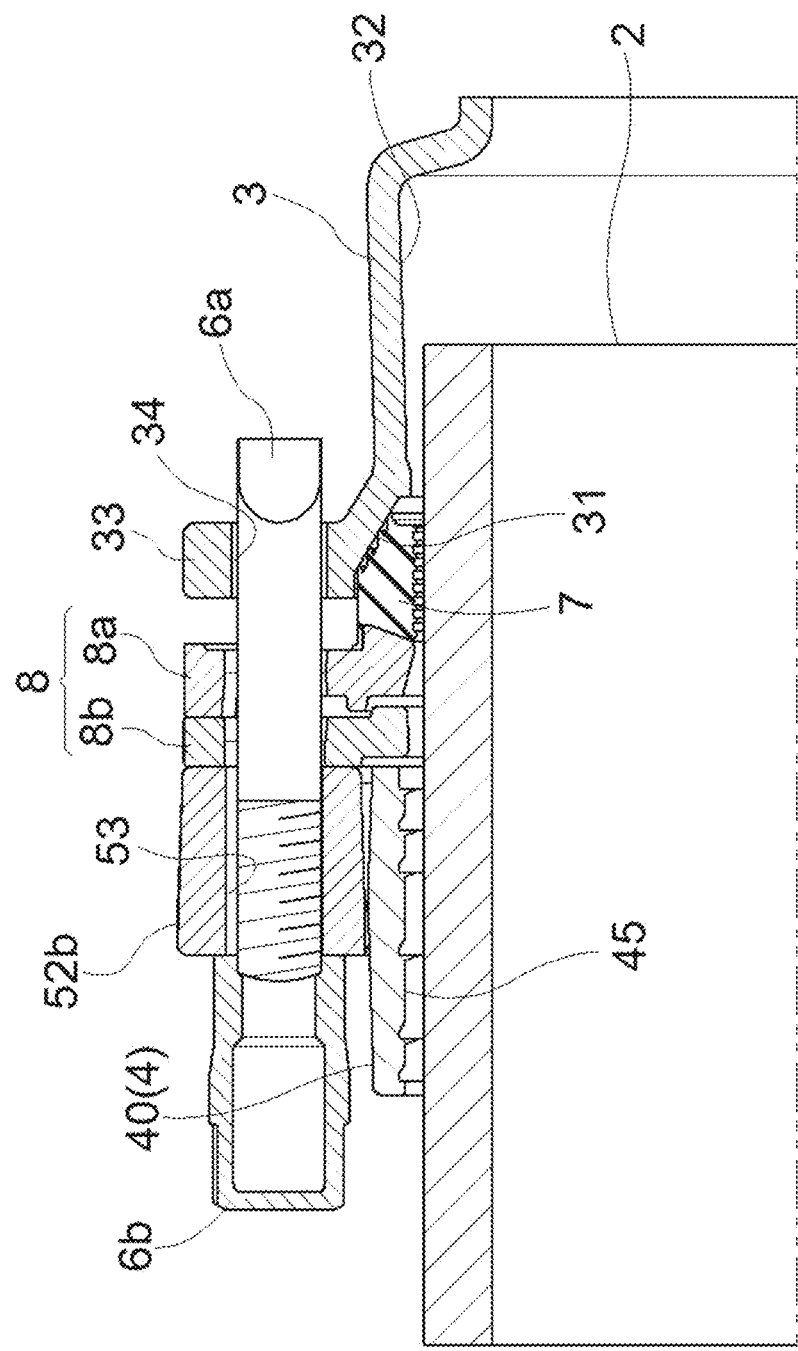
FIG. 7 is a cross-sectional view taken along a line VII-VII in FIG. 4.
Figure 8:
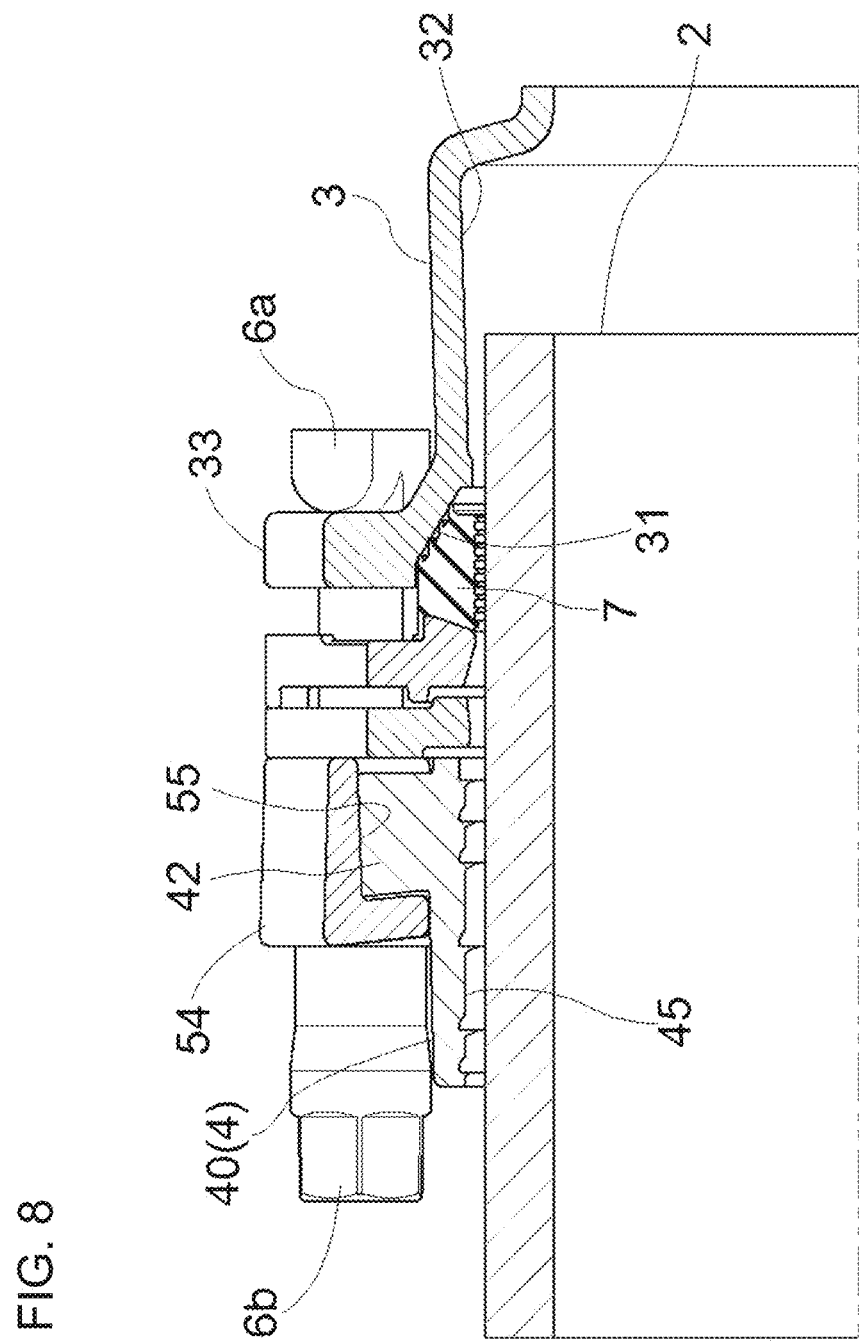
FIG. 8 is a cross-sectional view taken along a line VIII-VIII in FIG. 4.
Figure 10:
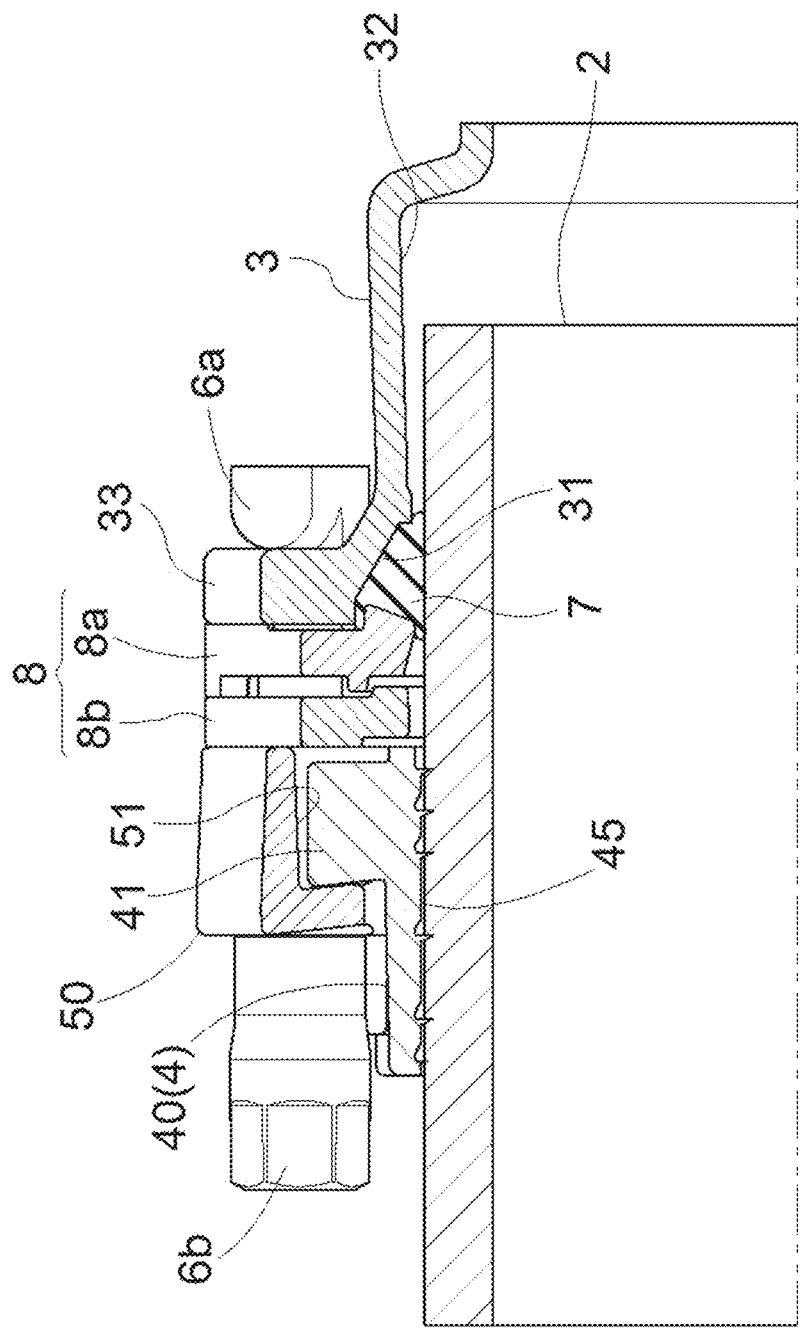
FIG. 10 is a cross-sectional view taken along a line X-X in FIG. 5.
Figure 11:
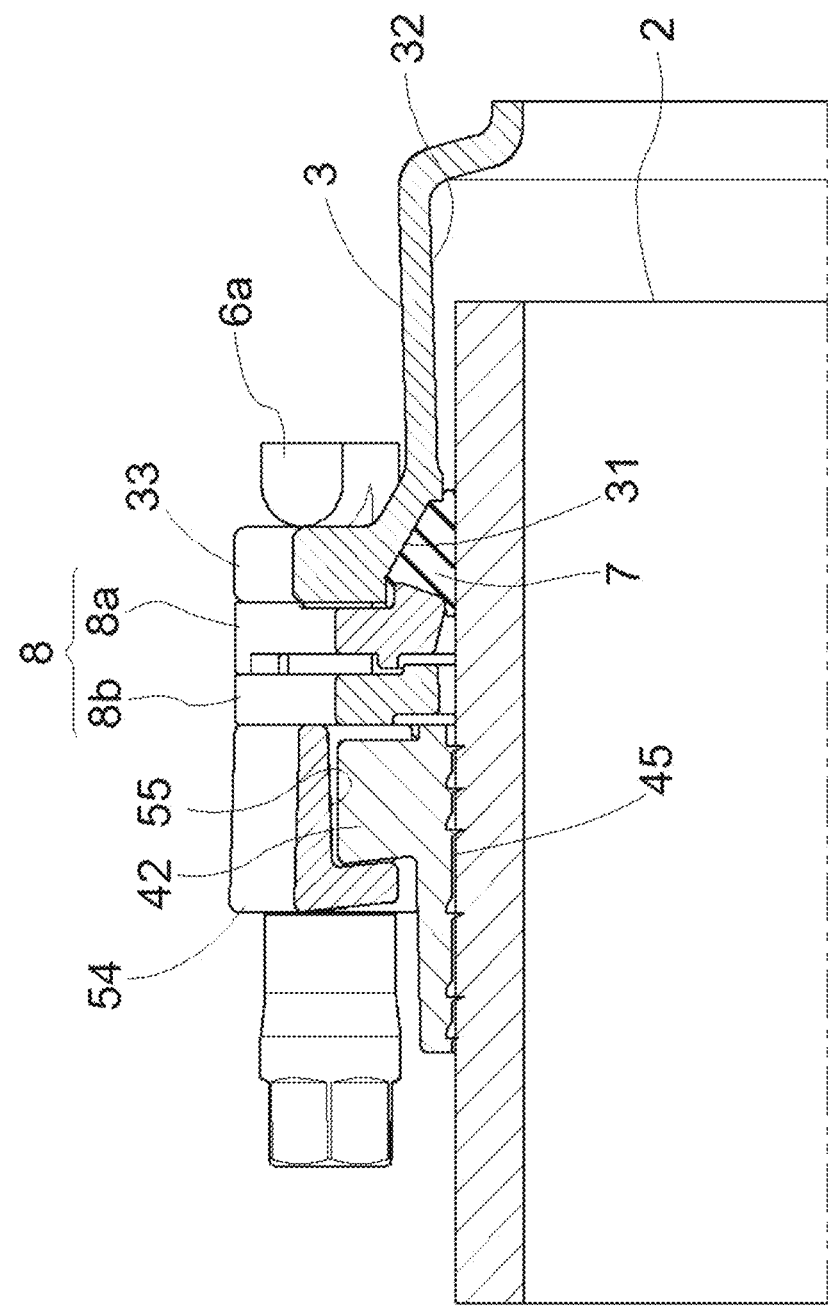
FIG. 11 is a cross-sectional view taken along a line XI-XI in FIG. 5.
Figure 12:
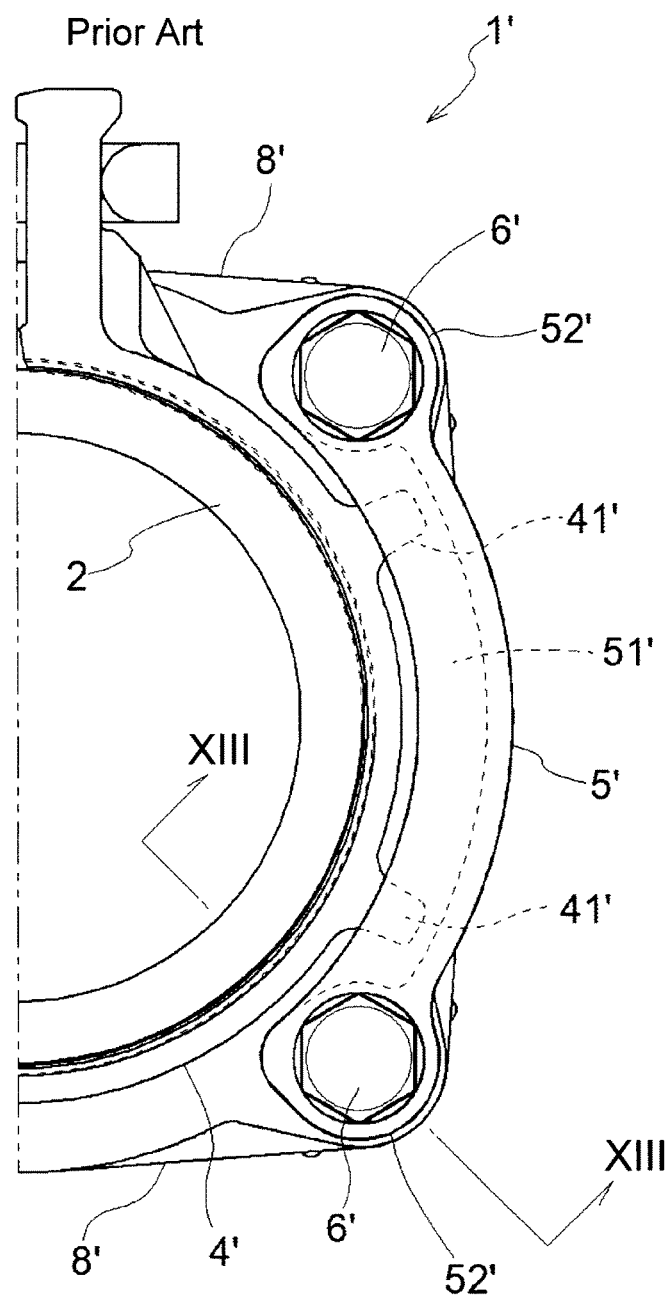
FIG. 12 is a view, corresponding to FIG. 9, of a conventional pipe coupling device.
Figure 13A:
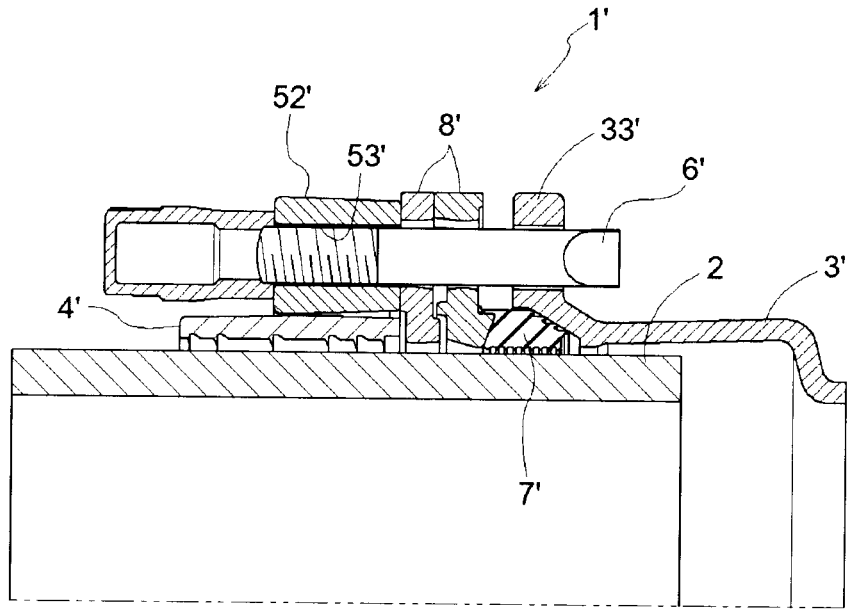
FIGS. 13A and 13B are cross-sectional views, each taken along a line XIII-XIII in FIG. 12, showing the conventional pipe coupling device in a state before fastening (FIG. 13A) and in a state after fastening (FIG. 13B).
Figure 13B:
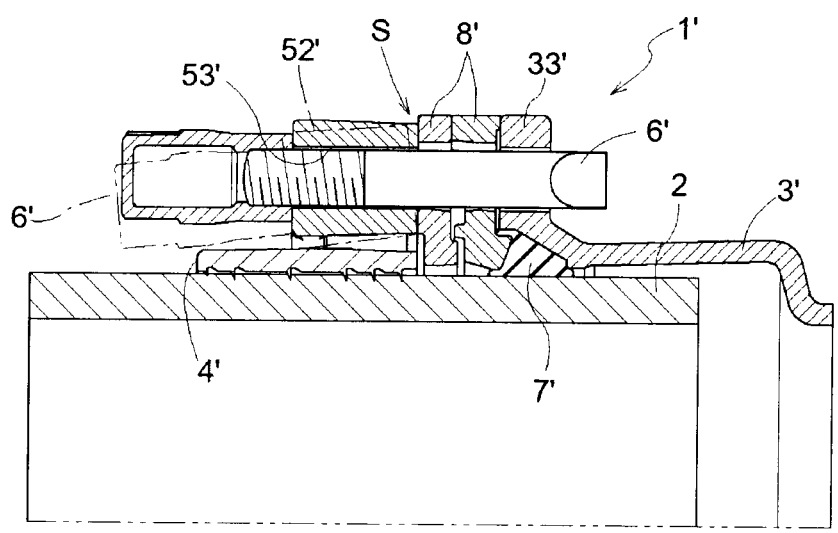

Since the second flange part 42 is housed in the second recessed part 55 formed at the protruding portion 54 that protrudes from the lower coupling part 52b toward the center portion 40N, the second flange part 42 is positioned inward of the straight line L connecting the center axes A of the bolts 6 that penetrate through the through-holes 53. This geometrical arrangement prevents inclination of the pressing plate 5. Specifically, as shown in FIGS. 5, 10, and 11, in the state where the retaining ring 4 is fastened, even when the flange parts 41 come into contact with the inner surface of the recessed part 51 and thereby the pressing plate 5 attempts to incline as described above, since the second flange part 42 is in contact with the second recessed part 55, the pressing plate 5 is prevented from inclining. Accordingly, the pressing plate 5 can be miniaturized and thinned and the diameter of each bolt 6 can be reduced, whereby weight reduction can be achieved without reducing the strength as a whole, resulting in improved workability.

As shown in FIGS. 2 and 6 to 8, the press ring 8 has an annular shape, and is composed of a pair of press rings 8a and 8b in the present embodiment. Each of the press rings 8a and 8b is provided with, at appropriate intervals, ribs 81 having through-holes 82 through which the bolts 6 are inserted. These through-holes 82 correspond to the above-mentioned through-holes. The press ring 8 presses the packing 7 against the socket part 31 of the joint body 3 when being fastened by the bolts 6, whereby the water tightness and the pipe holding force by the packing 7 are secured.

Lastly, the possibility of still another embodiment of the present invention will be described. It should be noted that like members as those in the embodiment described above are denoted by the same reference characters.

In the above embodiment, the polyethylene pipe 2 has been described as an example of the joining pipe. However, instead of the polyethylene pipe, a plastic pipe such as a vinyl chloride pipe may be used, for example. Further, not being limited to such a plastic pipe, the present invention can be applied to a metal pipe such as a ductile cast iron pipe, an SUS pipe, or a steel pipe, for example. In addition, a metal in-core may be internally fitted in a portion corresponding to an end of the joining pipe 2 to a fastening portion of the retaining ring 4.

In the above-mentioned embodiments, the second flange part 42 and the second recessed part 55 are provided near the center portion 40N of the ring body 40 (on the lower coupling part 52b side). It is also conceivable that the reinforcement part 46 is omitted and the second flange part 42 and the second recessed part 55 are provided on the upper coupling part 52a side. However, if the reinforcement part 46 is omitted, local deformation at the base end portion 43a of the protruding piece 43 cannot be prevented. Moreover, since the upper portion of the ring body 40 (on the protruding piece 43 side) is likely to be affected by the reduction in the diameter of the ring body 40, if the second flange part 42 is provided at the upper portion, a longer second recessed part 55 needs to be provided in the circumferential direction. As a result, the distance between the protruding pieces 43 before fastening should be reduced, which makes it difficult to realize great fastening (reduction in the diameter). Further, if the fixing member 49 is provided away from the ring body 40 to prevent interference between the fixing member 49 and the second flange part 42 provided at the upper portion, local deformation at the base end portion 43a is increased more, which makes it difficult to reduce the diameter of the ring body 40. Accordingly, in these respects, the above embodiment is advantageous. The shape and the like of the reinforcement part 46 are not limited to those of the above embodiment, and the reinforcement part 46 may have any shape and the like as long as local deformation can be prevented.

Further, while in the above embodiment, one end of the second recessed part 55 is opened, the shape of the second recessed part 55 is not limited thereto. However, the above embodiment is advantageous in terms of the workability.

While in the above embodiment, the T-head bolt is caused to penetrate through the pressing plate 5 without a thread groove formed in the inner surface of the through-hole 53, the present invention is not limited thereto. The coupling member can be modified as appropriate as long as the function thereof is not inhibited.

While in the above embodiment, each of the flange parts 41 and the second flange parts 42 is extended along the pipe axial direction so that the length thereof in the axial direction is greater than the thickness thereof in the circumferential direction, the shape of each flange part is not limited thereto. However, the above embodiment is advantageous in terms of the strength against the detachment force of the pipe and the workability.

While the above embodiment adopts the packing 7 having a tapered surface and the pair of press rings 8a and 8b, the present invention is not limited thereto. Any known sealing member and structure may be adopted as long as the water tightness can be secured. For example, instead of the pair of press rings 8a and 8b, a single-piece (one) press ring may be used. In addition, the shape and the structure of the press ring 8 are not limited to those of the above embodiment.

What is claimed is:
1. A pipe coupling device, comprising:
   a joint body into which a joining pipe is inserted;
   a C-ring-shaped retaining ring which includes a ring body and a flange part protruding from an outer peripheral surface thereof and which is fastened and fixed by a fixing member onto an outer peripheral surface of the joining pipe; and
   a pressing plate having a recessed part for housing the flange part,
   the joint body, the C-ring-shaped retaining ring, and the pressing plate being coupled together by use of coupling members, wherein
   the retaining ring further includes a second flange part protruding from the outer peripheral surface thereof,
   the pressing plate further includes a pair of through-holes through which the coupling members penetrate, and a second recessed part for housing the second flange part, each of the through-holes defining a center axis, a line extending between the center axes, the first recessed part positioned between the through-holes in a circumferential direction, the second recessed part formed on a protruding part extending from a circumferential end of the pressing plate in a cantilevered manner, a pair of the second flange parts are provided with a circumferential center portion of the ring body between them, and a pair of the pressing plates are provided with the circumferential center portion between them, the protruding part positioned on a same side of the line extending between the center axes as the circumferential center portion, and the recessed part is located between the pair of the through-holes, and the second recessed part is located outward of at least one of the pair of the through-holes in the circumferential direction.

2. The pipe coupling device according to claim 1, wherein the pair of second flange parts are located on the circumferential center portion with respect to the flange part, and the second recessed part is located outward, in the circumferential direction, of one of the through-holes close to the circumferential center portion.

3. The pipe coupling device according to claim 1, wherein the flange part is one of a plurality of flange parts, at least two pairs of flange parts are provided with the circumferential center portion between the at least two pairs of flange parts, and the at least two pairs of flange parts, the pair of second flange parts, and the pair of pressing plates are arranged linearly symmetrically with respect to the circumferential center portion.

4. The pipe coupling device according to claim 1, wherein each of the flange part and the pair of second flange parts has a substantially rectangular parallelepiped shape extending along an axial direction of the joining pipe.

5. The pipe coupling device according to claim 1, wherein the joining pipe is a plastic pipe.

* * * * *